United States Patent [19]

Roberts et al.

[11] Patent Number: 5,118,727

[45] Date of Patent: Jun. 2, 1992

[54] STABLE MIXTURES OF COLLOIDAL SILICA AND A FILM-FORMING POLYMER

[75] Inventors: William O. Roberts, Wilmington; Elizabeth R. Griffin, Newark, both of Del.

[73] Assignee: E. I. Du Pont de Nemours and Company, Wilmington, Del.

[21] Appl. No.: 669,733

[22] Filed: Mar. 13, 1991

[51] Int. Cl.⁵ .................... C08K 9/08; C08K 3/36
[52] U.S. Cl. .................... 523/216; 524/442; 524/443; 524/444; 524/492; 524/493; 524/847
[58] Field of Search ............ 523/216; 524/442, 443, 524/444, 493, 492

[56] References Cited

U.S. PATENT DOCUMENTS

| | | | |
|---|---|---|---|
| 2,833,661 | 5/1958 | Iler | 524/430 |
| 2,892,797 | 6/1959 | Alexander et al. | 252/313 |
| 3,024,145 | 3/1962 | Nickerson | 154/43 |
| 3,445,250 | 5/1969 | Preece | 106/38.27 |
| 3,520,242 | 7/1970 | Kemp et al. | 96/75 |
| 3,676,189 | 7/1972 | Woodward et al. | 117/76 |
| 3,738,957 | 6/1973 | Iler | 260/41 |
| 3,769,044 | 10/1973 | Horton | 524/46 |
| 3,773,776 | 3/1971 | Iler | 524/493 |
| 4,064,083 | 12/1977 | Horton et al. | 524/362 |
| 4,600,735 | 7/1986 | Larsson et al. | 523/216 |

OTHER PUBLICATIONS

*Journal of Colloid and Interface Science*, vol. 51, No. 3, Jun. 1975, pp. 388-393.

*Primary Examiner*—Paul R. Michl
*Assistant Examiner*—Peter Szekely
*Attorney, Agent, or Firm*—P. Michael Walker

[57] ABSTRACT

Binder compositions are disclosed that include silica aquasols having silica that is metal-modified to include a monolayer or less of a metal such as aluminum, tin, zinc or lead, and deionized to a pH of 2.5-7.0 and a water soluble polymer such as poly(vinyl alcohol).

An adhesive that includes a silica aquasol, an oxygen-moiety containing polymer, and clay, the surface of the silica being modified to include a metal, and the silica aquasol being deionized to a pH of 2.5 to 7.

25 Claims, No Drawings

STABLE MIXTURES OF COLLOIDAL SILICA AND A FILM-FORMING POLYMER

FIELD OF THE INVENTION

This invention relates to stable aqueous acidic mixtures, or compositions, of high silica content comprising a metal-modified, deionized colloidal silica and a film-forming polymer. These silica and polymer compositions offer excellent bonding and stability when combined with refractory particles to form slurries for use in making molds for use in an investment casting process.

These silica and polymer compositions are also useful in improving the tack and strength of water-soluble adhesives.

BACKGROUND OF THE INVENTION

Aqueous colloidal silicas, such as Ludox® SM and HS aqueous colloidal silicas sold by Du Pont, are widely used as binders to form molds for use in the investment casting industry.

Ceramic shell investment casting is a process that simplifies the manufacture of complex metal parts. Detailed metal parts may be cast in an almost unlimited selection of metals and alloys, to precision tolerances with fine surface finish.

A typical investment casting process comprises encasing an expendable wax or plastic pattern of the piece to be produced in a ceramic shell by dipping the pattern in a slurry of refractory grain and silica binder, coating the wet slurry on the pattern with a dry refractory grain, or stucco, and then drying the pattern. These steps are repeated until a necessary thickness of refractory is built up around the pattern to provide the required shell strength. The expendable pattern is melted out, the shell is fired to eliminate pattern residues, and metal is poured into the hollow shell. After solidification of the metal, the shell is broken away and discarded.

The pattern is prepared in a die, and must be washed to remove mold release agents, such as silicone, and greases. This wash is necessary to assure good wetting of the pattern during a prime coat dipping step because colloidal silica slurries do not "wet", or adhere to, the surfaces of a wax or plastic pattern, but rather bead and run off the pattern surfaces. Alcohols, such as ethanol, ketones, such as methyl ethyl ketone, and fluorocarbons, such as Freon® TF are often used as pattern washes.

Wetting agents and latex additives are sometimes added to the first or "prime" coats of slurry to improve adhesion to the wax.

Coating slurries are prepared by mixing a colloidal silica and a refractory grain. Typically two slurries are prepared: a prime coat slurry and a back-up slurry. The prime coat slurry typically contains a surfactant to promote uniform wetting of the pattern. Surfactant levels are usually from 0.1 to 1.0% based on the binder content of the slurry.

The prime coat slurry usually has a high refractory grain content and viscosity (15-35 seconds —#5 Zahn cup) and normally is used to apply the first two coats to the pattern. A fine grain, 200 to 300 mesh, is used in the prime coat slurries because the fine grain forms a smooth surface, closely reproducing the surface of the wax pattern.

Subsequent coats are applied to the pattern using the back up slurry. The back up slurry usually has a somewhat lower grain content and viscosity (7-20 seconds —#5 Zahn cup) than the prime coat slurry, and uses larger mesh grains.

The exact pattern coating sequence varies from user to user, but the following procedure is not atypical. The pattern is dipped into the prime coat slurry, making sure that all surfaces of the pattern are evenly coated. Excess slurry is drained back into the slurry tank.

The wet pattern is then stuccoed with refractory grain. The particle size of the stuccoing grain is generally 50-120 mesh for the prime, or inner, coats and 20-100 mesh for the back-up coats. After stuccoing, the coated pattern is allowed to dry.

Subsequent coats of the slurry are applied by dipping the pattern in the slurry, stuccoing the pattern, and drying the pattern. Four to nine or more coats of the slurry are generally required, depending on the casting size and the metal pressures to be encountered. The last coat is normally not stuccoed because an outside coating of stucco may become dislodged from the pattern, which is undesirable. After the final coat, the shell is dried until the final moisture content is about 2% or less.

After the shell is dried, the wax pattern is removed. This is usually accomplished by rapid heating in an autoclave, so that the outer surface of the wax is liquified and drained first. If the pattern is not heated in this manner, the bulk of the wax expands and cracks the shell.

The shell is fired to burn out the remaining pattern residue, and then molten metal is poured in the shell. When the metal has solidified, the shell is broken and removed from the casting.

As discussed above, additives such as wetting agents or latex are often added to a prime coat slurry to promote adhesion of the slurry to the pattern. However, these additives have the significant disadvantage of shortening the life of a slurry by causing the slurry to gel, or, in the case of latex, causing the latex to separate from the slurry.

It was attempted in the prior art to add a water-soluble polymer, such as poly(vinyl alcohol) (PVA), to colloidal silica slurries to promote the adhesion of the slurry to a wax pattern and to improve the film strength of the slurry. However, as described in U.S. Pat. No. 3,738,957, compositions of colloidal silica and PVA are unstable and separate over time, which is undesirable because such compositions may be stored for long periods of time in drums, or may be used to make slurries which are desired to last several months.

A conventional method for making adhesives is to mix poly(vinyl alcohol) in an aqueous slurry. Optionally, tackifiers such as boric acid and fumaric acid may be added to the adhesive to increase the tack of the adhesive.

Adhesives have many uses, one of which is in the manufacture of paper tubes. One way of making paper tubes is to provide a solid rod, or mandrel, that has a diameter equivalent to the desired inside diameter of the tube. A first wrap of paper having a desired width is wound spirally around the mandrel. A second wrap of paper is coated on both sides with the adhesive and is wound spirally around the mandrel on top of the first wrap. Additional wraps of paper may be wrapped around the mandrel until the tube has a desired thickness. A final wrap, which has no adhesive, is wrapped on top of the last adhesive-coated wrap.

The quality of the adhesive used in making the tube can be determined by measuring the crush strength of the tube. Crush strength is the amount of force required to cause failure of the tube in a direction perpendicular to the axial direction.

SUMMARY OF THE INVENTION

This invention relates to stable compositions of a mixture of a metal-modified, deionized colloidal silica aquasol and an oxygen-moiety containing polymer that has excellent stability and good film-forming capabilities. The enhanced stability includes both the stability with respect to the pH of the composition and the resistance of the composition to separation of the colloidal silica and PVA.

The composition comprises an aqueous colloidal silica having a surface that is modified to include a monolayer or less of an amphoteric metal, preferably aluminum. The metal-modified aqueous colloidal silica is deionized to a pH of 2.7–7.0 and mixed w an oxygen-moiety containing polymer, such as PVA. For use as a binder in investment casting, PVA is added to the metal-modified, deionized aqueous colloidal silica in any proportion such that the ratio of silica:PVA is greater than 1:1, and preferably greater than 10:1, and the concentration of silica is between 10 and 35% by weight of the composition. Other additives, as practiced in the art, may also be included in the composition.

The composition of metal-modified, deionized silica and PVA may be combined with particulates, such as a refractory particulates, to form a slurry that exhibits improved stability over conventional slurries and includes no high vapor pressure organic solvents, such as ethanol. Organic solvents are undesirable in slurries because they make the slurry flammable.

The inventive slurry composition, when used in an investment casting process to make a mold or shell, imparts good strength to the shell in both a fired and an unfired condition. The slurry also exhibits improved coating strength that permits reduction of the total numbers of layers of the slurry that are required to produce a shell. The inventive binder has the additional advantage of having a greater resistance to high temperature conversion to crystalline silica and less tendency toward high temperature flow or "creep" than conventional colloidal silica binders.

This invention also relates to an improved adhesive composition that includes a metal-modified, deionized colloidal silica aquasol, an oxygen-moiety containing polymer and clay that exhibits improved tack and improved laminate strength.

DETAILED DESCRIPTION OF THE INVENTION

The composition of the present invention comprises a modified colloidal silica aquasol and an oxygen-moiety containing polymers, such as poly (vinyl alcohol) (PVA). This composition is sometimes referred to hereafter as a binder. The surface of the silica is modified to include a monolayer or less of an amphoteric metal, and the metal-modified colloidal silica is deionized to a pH of 2.7–7.0. The colloidal silica is then added to an aqueous PVA solution to form a binder.

The stability of the inventive colloidal silica/PVA composition is derived from the metal-modified colloidal silica surface of the silica aquasol.

The silica aquasol has an average particle size of 3 to 150 nanometers (nm), preferably 5 to 30 nm, and a silica content of 5–40 wt%, preferably 15–35 wt% and most preferably 20–30 wt%.

Metal is incorporated into the surface of a suitable colloidal silica starting material by methods including, but not limited to, the methods disclosed in U.S. Pat. No. 2,892,797 and U.S. Pat. No. 3,007,878, both of which are incorporated herein by reference. Metal coverage of the surface of the silica should range from approximately 1 to 100%, and preferably 5 to 100%, of an essentially monolayer, or monomolecular layer, of the metal. Aluminum, tin, zinc and lead are the preferred metals with aluminum being especially preferred. Generally, the metal is chemically combined with the surface silica of the silica aquasol.

Stability of the inventive composition is further achieved by deionizing the metal-modified silica aquasol to remove of all but trace quantities of alkaline ions from the aquasol. Alkali metal ions may be replaced by H+ ions to achieve an operating pH range of 2.5–7.0. Known methods of deionization which may be used include, but are not limited to, the use of ion exchange resins and dialysis.

Aqueous PVA in any proportion is added to the surface modified, deionized acidic colloidal silica aquasol to form a binder having improved film-forming characteristics. The addition of the PVA to the aquasol may be accomplished by any method which results in keeping the PVA in aqueous solution One method is to prepare an aqueous solution of PVA, and add the aqueous PVA to the aquasol. Another method is to add PVA directly to the aquasol, and heat and stir the aquasol to dissolve the PVA in the aquasol.

The PVA may be prepared from polyvinyl acetate and should contain at least 85% OH groups calculated as vinyl alcohol. The concentration of PVA in the aqueous solution should be about 10% or less to give convenient viscosity levels.

A suitable molecular weight range for the PVA is approximately 20,000 to 300,000. Higher molecular weights tend to be more viscous.

Excellent binder characteristics are achieved at ratios of silica to PVA (silica:PVA) greater than 1:1. The preferred ratio for use as an investment casting binder is greater than 10:1. A high silica content is necessary for the investment casting process because when a shell made from the inventive binder is fired, the PVA burns off and only silica is left. Therefore, the binder must include enough silica so that the shell does not fall apart when it is fired.

Additives for purposes known in the binder art may also be added to the inventive binder to enhance specific properties. Optional additives may include, but not be limited to, wetting agents, such as sodium dioctyl sulfosuccinate, anti-foaming agents such as Burst® RSD-10, a reacted polysiloxane emulsion in water sold by Hydrolabs, Inc., of Patterson, N.J., plasticizers such as polyethylene glycol or glycerine, indicator dyes such as fluorescien, anti-freeze such as ethylene glycol, and bacterial growth inhibitors such as formaldehyde.

A casting slurry which exhibits improved stability comprises a combination of the inventive binder and a suitable refractory as is common in the art of casting. Examples of such refractories are fused silica and zircon. Refractory particle size is typically in the range of 100-350 mesh, U.S. sieve series, but may also be outside this range. Convenient viscosities of the casting slurry are 7-50 seconds (#5 Zahn cup).

EXAMPLE 1

About 1800 g of Ludox® AM colloidal silica, a commercial product of Du Pont, which is a 12 nm colloidal silica surface-modified with sodium aluminate, was deionized by adding HCR-W-2, a strong acid cation exchange resin in the form of beads sold by Dow Chemical under the trademark Dowex, to the silica in a large beaker with agitation. The surface aluminate level on Ludox® AM is about 4 to 5%, meaning that about 4 to 5% of the surface of the Ludox® AM colloidal silica has been modified to be covered with aluminum. The silica particles in Ludox® AM are dispersed in an alkaline medium of sodium hydroxide which react with the silica surface to produce a negative charge. Ludox® AM colloidal silica has a pH of 8.8 at 25° C., and includes 0.24 weight percent titratable alkali as $Na_2O$. A pH meter was used to follow the pH as an indication of the deionization process. The deionized silica had a pH of about 3. The deionized Ludox® AM silica was recovered by filtering out the resin beads. The resin may be washed, regenerated with dilute sulfuric acid and washed free of residual salts and acid for reuse.

The specific gravity of the deionized silica aquasol was 1.20, corresponding to 29.6 wt% silica.

The aqueous PVA was prepared as follows. 225 g of distilled water were placed in a glass beaker with a Teflon® fluorocarbon-coated magnetic stirring bar and 25 g of Elvanol® 90-50 grade PVA, sold by Du Pont, were added. The beaker was placed on a hot plate equipped with a magnetic stirring device and stirred without added heat to disperse the PVA in the water. The beaker and contents were then heated slowly with continuous agitation to about 90-95° C. The PVA dissolved and formed a clear, viscous liquid which was about 10% PVA solids.

The 1800 g of the deionized Ludox® AM silica aquasol were mixed with 200 g of the aqueous PVA solution to form a binder composition. The two mixed together readily and gave a stable binder solution. Two samples of the binder were obtained, and one was stored at room temperature and the other was stored at 60° C. in an oven. Storage at 60° C. appears to accelerate any instability of the binder about 10-fold. Thus, 1 month in the oven test is usually equivalent to aging the binder about 10 months at ambient temperature. After 4 months, neither sample showed any signs of separation or changes in turbidity or viscosity.

EXAMPLE 2

A binder of colloidal silica and PVA was prepared exactly as in Example 1, except that Ludox® HS-30 colloidal silica, sold by Du Pont, was used instead of Ludox® AM. Ludox® HS-30 colloidal silica is a 12 nm colloidal silica containing 30 wt% $SiO_2$, but is not surface modified with aluminum. The resulting silica/PVA binder solution was much more turbid in comparison to the binder of Example 1 and showed signs of separation within a few minutes. Again, two samples of the binder were taken, with one sample being kept at ambient temperature and the other sample being placed in an oven. The sample which was placed in the oven gelled within a few hours and the sample which was kept at room temperature gelled in about 20 hours.

EXAMPLE 3

Ludox® AM colloidal silica was acidified using hydrochloric acid to several pHs between 2.9 and 7 and mixed with the PVA solution of Example 1 to produce binders which were all about 27 wt% $SiO_2$ and 1 wt% PVA solids. All of these binders showed some indication of cloudiness when initially made, as indicated below:

| pH | Appearance |
| --- | --- |
| 7 | Cloudiest mixture |
| 6 | Slightly cloudy |
| 4.8 | Very slightly cloudy |
| 3.5 | Slightly cloudy |
| 2.9 | Cloudy |

Two samples of each binder were taken, and with one of the samples being subjected to the oven test and the other sample being subjected to the room temperature test, as described above. In the oven test, each of the five samples separated into two layers within a few days. However, they remained fluid due to the enhanced pH stability which the aluminum coating imparted to the silica colloids. Each of the five room temperature samples separated within 14 days.

EXAMPLE 4

Ludox® AM colloidal silica, which was not deionized and had a pH of about 8.8, was combined in various proportions with 10% PVA solution made from Elvanol® 90-50 PVA. The binder compositions are tabulated below:

| % Ludox® AM Colloidal silica | % Elvanol® 10% PVA Solution |
| --- | --- |
| 90 | 10 |
| 80 | 20 |
| 70 | 30 |
| 30 | 70 |

All binder mixes were initially clear and appeared stable. Two samples of each binder were taken, one sample of each binder being subjected to the oven test and the other sample of the binder being subjected to the room temperature test, as described above. Each of the samples placed in the oven showed signs overnight of the onset of separation. Each of the room temperature samples separated completely into two distinct layers within two weeks.

The results of Examples 1 to 4 show that using a colloidal silica that is both deionized and metal-modified in a binder of colloidal silica and PVA provides enhanced long term stability of the binder and is a sufficient improvement over compositions where the colloidal silica is not metal modified (Example 2), the colloidal silica is acidified but not deionized (Example 3), or the colloidal silica is not deionized (Example 4).

EXAMPLE 5

This Example illustrates the use of inventive binders in an investment casting process. The steps used below are not atypical of current industrial practices.

1800 g of the Ludox® silica aquasol/PVA binder mixture of Example 1 were provided, and to it were added, with stirring, about 250 ppm of a silicone antifoam, Burst® RSD-10, and 0.15 wt% of a wetting agent, sodium dioctyl sulfosuccinate. The final binder mixture contained about 27 wt% $SiO_2$ and 1 wt% PVA. The $SiO_2$:PVA ratio was, therefore, about 27:1.

This binder mixture was placed in a wide-mouthed plastic jar, and about 6000 g of zircon flour (about 325 mesh) were added to form a slurry, and the jar was tightly capped. The jar and its contents were placed on a jar roller and allowed to rotate for about 16 hours to mix the contents thoroughly.

The slurry was transferred to an open-topped vessel equipped with an agitator. The slurry was continuously agitated in order to keep the zircon flour refractory uniformly suspended. The slurry was adjusted to a viscosity of 10 seconds (#5 Zahn cup) by adding a small amount of additional binder.

About 10 wax bars measuring 0.5"×0.8"×8.0"0 were cleaned as follows. The bars were immersed in Freon ® TF solvent for about 30 seconds, washed with soap and water, rinsed with water and air dried. The bars were dipped into the slurry to a depth of about 6" and then removed from the slurry, where the excess slurry was allowed to drain off for about 30–60 seconds. The bars were then sprinkled with 30–35 mesh fused silica until the entire surface of the wet slurry had absorbed as much of the fused silica as possible.

The wet slurry coating was scraped off the 0.5"×8.0" sides of the bars, and the bars were allowed to dry at room temperature. This process of dipping the bars in the slurry, allowing the excess slurry to drip off, covering the coated bars with fused silica, scraping the 0.5"×8.0" sides of the bars, and drying the bars was repeated 4 more times, except that the last coat of slurry was not covered with fused silica.

After the coatings on the bars were completely dry, the bottoms of the hard, U-shaped coatings were cut from the wax bars using a carbide impregnated saw blade. The remaining 2 pieces of the coating were removed from each wax bar by immersing the wax bars and attached coating pieces in a pan of methyl-ethyl ketone or Freon ® TF solvent. After about 30 seconds, the wax was lightly distorted by placing a knife blade in the center of the sides of the wax bars. The pieces of coating typically fell away.

The resulting pieces of coating were bars roughly 0.8" wide, 0.15" thick and 6.0" long. About 20 such pieces were obtained. The bars were allowed to dry free of solvent and then 10 of the bars were placed in an oven at a temperature less than 300° C. and heated to 900° C. and held at 900° C. for 45 minutes. The bars were removed from the oven and cooled in air. In the Table below, these bars are referred to as "fired". The remaining unfired bars are referred to below as "green", in keeping with ceramic nomenclature.

The 10 green and 10 fired test specimens were broken on an Instron testing machine using the conventional three-point loading technique, and the modulus of rupture (MOR) was determined from the following equation:

MOR (psi) = 3 * Span * Load/2 * w * t * t, where
Span = distance over which the bar is supported (inches)
Load = force needed to break the bar (pounds)
w = width of the bar (inches)
t = thickness of the bar (average) at the break (inches).

The results for the several bars were averaged. The breaking tests were repeated every 2 weeks by preparing 20 new bars each time from the original slurry, firing 10 of the bars, and breaking the fired and unfired bars on the Instron testing machine in order to track the stability of the slurry.

During the time the breaking tests were being conducted, the pH of the slurry was measured occasionally and was found to drift upward to about 4.5. No attempt was made to alter or adjust the pH. Conventional alkali-stabilized binders require routine monitoring of the pH and usually require the addition of alkaline material in order to prevent the pH from falling to a level where the colloidal silica becomes unstable. The results of the bar breaking tests are listed below:

| Elapsed Time | MOR vs. TIME Green Strength | Fired Strength |
|---|---|---|
| 2 days | 472 | 749 |
| 2 weeks | 567 | 881 |
| 4 weeks* | 501 | 730 |
| 6 weeks | 484 | 786 |
| 8 weeks | 645 | 724 |
| 10 weeks* | 537 | 741 |
| 12 weeks | 555 | 626 |
| 14 weeks | 774 | 715 |
| 16 weeks | 591 | 660 |
| 18 weeks | 745 | 872 |
| 20 weeks* | 703 | 755 |
| 22 weeks | 681 | 666 |
| 24 weeks | 733 | 745 |
| 27 weeks* | 903 | 845 |
| 29 weeks | 706 | 641 |
| 34 weeks | 632 | 876 |

These results indicate that the stability of the slurry over time was good, because the strength of the test bars remained at a high level during the full time of the test. The results obtained compare favorably with the strength levels of bars prepared with conventional slurries.

Additional fresh slurry was added from time to time to maintain the level in the dip tank, as shown by the *.

At the end of the testing period, the slurry was placed in a jar and rolled to maintain the refractory in suspension.

About 14 months after the slurry was started it was tested for viscosity and found that it was still fluid and did not show any evidence of gelation.

EXAMPLE 6

Slurries similar to those of Example 5 were prepared except that 120 mesh fused silica was used as the refractory material instead of zircon flour. Slurries were made with the following binders that included deionized Ludox ® AM colloidal silica:
1. No added PVA — resulting binder contained about 30 wt% $SiO_2$.
2. 1 wt% added PVA — resulting binder contained about 27wt% $SiO_2$.
3. 2 wt% added PVA — resulting binder contained about 24 wt% $SiO_2$.

Test bars made from the slurries were prepared and tested for strength as in Example 4, with the results of those tests given below:

| % PVA | Green MOR | Fired MOR |
|---|---|---|
| 0 | 264 | 774 |
| 1 | 479 | 784 |
| 2 | 610 | 758 |

These results clearly show the enhancement of the strength of the green bars by the addition of PVA to the binder. The virtually constant fired strength indicates that Ludox ® particles are present as a co-continuous network since its bonding is not significantly interrupted when the bar is fired and the PVA burns out of the bar.

EXAMPLE 7

This example illustrates the effect of variations in the amount of the surface of the silica that is covered with aluminum.

Samples of 12 nm colloidal silica having 4.5, 6.4, 8.3, 11.1, and 14% surface coverage of alumina were prepared using methods similar to those discussed in U.S. Pat. No. 2,892,797. These samples were deionized and 10 parts of a 10% solution of Elvanol ® 90-50 were added to 90 parts of each sample. Each sample showed excellent stability and no tendency to separate. The viscosity of each sample was measured at 25° C. using a Cannon-Fenske viscometer. The results are as follows.

| % Surface Coverage | Viscosity (cps) |
| --- | --- |
| 1.4 | 15.3 |
| 2.8 | 13.1 |
| 4.5 | 8.5 |
| 6.4 | 7.0 |
| 8.3 | 6.4 |
| 11.1 | 5.8 |
| 14.0 | 6.0 |

The changes of Viscosity with alumina level allows the maximization of the refractory loading the binder composition can carry because as the viscosity goes down, more refractory may be added to the binder. Higher loadings of refractory are desirable because there is less of a likelihood of cracks forming during drying of a slurry composition made with the inventive binder. It is therefore highly desirable for the binder to be able to suspend as much refractory as possible while maintaining a slurry viscosity that allows for good flow characteristics of the binder.

Three test slurries were made using 325 mesh zircon flour as the refractory. Test slurries 1 and 2 were aluminated, deionized 12 nm sols that contained poly(vinyl alcohol) and about 25% silica. Slurry 1 had 4.5% surface coverage of alumina, and slurry 2 had 11% surface coverage of alumina. Slurry 3 was a control slurry and included Ludox ® HS-30, a 12 nm, sodium hydroxide stabilized sol containing 30% silica, and is representative of a typical investment casting binder. The refractory:binder ratio that gave the same slurry viscosity of 15 seconds on a #5 Zahn cup was measured. The results were as follows.

| Slurry | % Surface Coverage | Refractory:Binder |
| --- | --- | --- |
| 1 | 4.5 | 3.05:1 |
| 2 | 11.0 | 3.56:1 |
| 3 | 0 | 3.41:1 |

Thus, using the proper level of alumina coverage allows the maximization of the refractory:binder ratio, and allows the refractory:binder ratio to be as good as or better than the ratios in the prior art.

EXAMPLE 8

This example illustrates the use of other sizes of colloidal silica to make binder compositions.

Using the methods of Example 1, a 22 nm particle size colloidal silica was modified with sodium aluminate. The resulting colloid was 35% silica, with about 5-6%, on average, of the surface of the silica particles being covered with alumina.

The sol was deionized using a strong acid ion exchange resin, and portions of the sol were mixed with different quantities of 10% Elvanol ® 90-50 solution to produce formulations including 24.5% SiO$_2$ and 3% Elvanol ® solids, 28% SiO$_2$ and 2% Elvanol ® solids, and 31.5% SiO$_2$ and 1% Elvanol ® solids.

All three samples showed excellent stability with respect to separation and gelation.

Each sample was coated onto a glass plate to form a hard, abrasion-resistant coating. The glass plate coated with 24.5% SiO$_2$ and 3% Elvanol ®, after it was dry, was immersed in water for about 15 days. After the glass plate was removed from the water, the coating appeared unaffected and was still hard and abrasion resistant.

It was attempted to make a control sample of the deionized sol without including Elvanol ®, but the sol did not form a coating and instead flaked off a glass plate during the drying step.

EXAMPLE 9

This example illustrates the use of a polymer other than PVA to make a binder composition.

A 10% solution of Methocel ® A15-LV, which is a methyl cellulose product of Dow Chemical Co., was prepared in accordance with the manufacturer's instructions.

A colloidal silica having an average particle size of 12 nm was coated with enough alumina to cover 9% of the surface of the particle. The resulting sol was deionized below pH 3 at room temperature.

Two parts by weight of the Methocel ® solution was added to 18 parts by weight of the deionized sol, and the mixture was shaken to dissolve the Methocel ® in the sol. The resulting solution was very clear, but quite thick. When shaken, the solution foamed very little, and the little foam that was present broke down within minutes.

As a comparison, two parts by weight of the Methocel ® solution was added to 18 parts of Ludox ® HS-30, which is an alkaline sol containing 30% silica and having an average particle size of 12 nm. The resulting solution was cloudy and foamed readily. After several hours, the foam persisted.

After standing for about 64 hours, the HS-30 solution separated into two layers. The deionized, alumina treated silica and Methocel ® solution was still clear and single-phased.

EXAMPLE 10

This Example illustrates the use of a colloidal silica wherein the particles are 100% covered with alumina.

An alumina-coated colloidal silica having a particle size of 12 nm was prepared according to U.S. Pat. No. 3,719,607 to give a sol containing about 26% silica and 4% alumina. The alumina content represented 100% coverage of the silica surface. The resulting colloid was positively charged and was very stable at a pH of about 3-5. Several mixtures of the sol and a 10% PVA solution were made as follows:

| Grams of 10% PVA Solution | Grams of Sol |
|---|---|
| 10 | 90 |
| 30 | 70 |
| 50 | 50 |
| 70 | 30 |
| 90 | 10 |

All of these mixtures were stable and showed no sign of separation on standing. When coated out on glass plates, all of the mixtures formed strong coatings. The results indicated that the sol and PVA solution formed stable mono-phased mixtures over the entire range of possible mixtures of PVA and the sol.

ADHESIVES

The present invention also relates to an adhesive composition that includes a metal-modified, deionized colloidal silica aquasol, an oxygen-moiety containing polymer and clay. The inventive adhesive exhibits improved tack and improved laminate strength. The adhesive, when used to make paper tubes, increases the crush strength of the tubes.

The metal-modified, deionized colloidal silica that can be used to make the adhesive is described above. The oxygen-moiety containing polymer is poly(vinyl alcohol).

Additives for purposes known in the art can also be added to the adhesive. Such additives include tackifiers such as boric acid and fumaric acid.

The strength of the adhesive can be measured by using the adhesive to make paper tubes, and then testing the crush strength the tubes made with the inventive adhesive against the crush strength of tubes made from conventional adhesives that include PVA and clay. The strength of the adhesive may also be tested by using the adhesive to join together two pieces of linerboard, and then testing the flexural modulus of the joined linerboard.

EXAMPLE 11

The following general procedure was used to prepare adhesive samples 1-4.

A container having a mixer was provided, and water was added to the container. The mixer was turned on to create a vortex in the water, and, for those samples where they were included, boric and fumaric acid were added to the water.

Elvanol ® 71-30 pVA was added to the water slurry and the slurry was mixed at room temperature for 5 minutes until the PVA "wetted down". Next, ASP 600 clay obtained from Engelhard of Edison, N.J. was added to the slurry, and the slurry was continued to be mixed.

The container was placed in a hot water bath having a temperature of 195° F. for 30 minutes while maintaining the constant stirring of the slurry. After 30 minutes, the container was removed from the hot bath and placed in a cold bath having a temperature of from room temperature to 120° F. and stirred slowly for 30 minutes to make sure the PVA was dissolved in the slurry and the clay was dispersed in the slurry.

At this point a metal-modified, deionized colloidal silica was added to the slurry. The colloidal silica was present in a sol having a solids content of approximately 29-30%. The colloidal silica had a particle size of 12 nm, with 11% of the surface of the particles being covered with alumina. The sol was deionized to a pH of 3.

The following samples 1-4 were made using this procedure.

| Ingredient | 1 | 2 | 3 | 4 |
|---|---|---|---|---|
| PVA | 32 g | 32 g | 32 g | 32 g |
| clay | 64 | 64 | 64 | 64 |
| boric acid | 2.24 | | 2.24 | 2.24 |
| fumaric acid | 0.32 | | 0.32 | 0.32 |
| water | 301.44 | 301.44 | 301.44 | 301.44 |
| colloidal silica | | | 9.6 | 14.4 |
| total | 400 g | 397.44 g | 409.6 g | 414.4 g |
| % solids (measured) | 24.2% | 24.0% | 24.2% | 24.4% |
| pH at room temp. | 3.98 | 4.89 | 4.01 | 4.00 |
| viscosity (cps) at 120° F. | 1,074 | 530 | 994 | 992 |

The tack of the samples was tested using the following procedure. The adhesive sample was heated to 120° F. Two pieces of approximately 1"×12"42 # linerboard were provided. One piece of the linerboard was placed on a flat surface, and a thin line of adhesive was applied width-wise across the linerboard, about 1" from an end, using an eye dropper. A #12 RDS wire rod was used to spread, or draw down, the adhesive along the 12" long surface of the linerboard, starting 1" in from one end of the linerboard. The second piece of linerboard was placed onto the layer of adhesive on the first piece of linerboard, and the joined pieces of linerboard were run through a compression device three times.

A stopwatch was started, and the two pieces of linerboard were slowly pulled apart from the end of the linerboard that was not joined by the adhesive until it was determined that the adhesive had become tacky, at which point the elapsed time was noted. The results are as follows.

| Sample Number | Bond Time | Bond Quality |
|---|---|---|
| 1 | 5-10 secs. | excellent |
| 2 | 10-15 secs. | good |
| 3 | 0-5 secs. | excellent |
| 4 | 0-5 secs. | excellent |

None of these four samples suffered from cohesive failure, that is, failure due to the weakness of the adhesive. The quality of the adhesives of samples 1-4 was determined to be very good because when the linerboards were pulled apart, failure occurred in the linerboard substrate. That is, when the linerboards were pulled apart, the linerboards failed before the adhesive failed.

We claim:

1. A binder composition comprising
    a silica aquasol and
    poly(vinyl alcohol) or methyl cellulose,
    the surface of the silica being modified to include a metal, and
    the silica aquasol being deionized to a pH of 2.5 to 7 by removing all but trace quantities of alkaline ions from the silica aquasol,
    wherein the binder composition is resistant to the separation of the silica aquasol and the poly(vinyl alcohol) or methyl cellulose.

2. The binder of claim 1 wherein from 1 to 100% of the surface of the silica is metal modified.

3. The binder of claim 1, wherein the weight ratio of silica is poly(vinyl alcohol) or methyl cellulose is greater than 1:1.

4. The binder of claim 1, wherein the silica aquasol includes 5 to 40 percent silica.

5. The binder of claim 1, wherein the poly(vinyl alcohol) has a molecular weight of 20,000 to 300,000 and contains at least 85 weight percent alcohol groups, calculated as vinyl alcohol.

6. The binder of claim 1 wherein the average particle size of the silica in the aquasol is from 3 to 150 nm.

7. The binder of claim 1 wherein the metal is aluminum, tin, zinc or lead.

8. A method of making a binder composition comprising the steps of:
providing a silica aquasol,
providing poly(vinyl alcohol) or methyl cellulose,
modifying the surface of the silica to include a metal,
deionizing the silica aquasol by removing all but trace quantities of alkaline ions from the silica aquasol until the aquasol has a pH of 2.5 to 7,
preparing an aqueous solution of the poly(vinyl alcohol) or methyl cellulose, and
mixing together the surface-modified, deionized silica aquasol and the aqueous poly(vinyl alcohol) or methyl cellulose to form a binder composition is resistant to the separation of the silica aquasol and the poly(vinyl alcohol) or methyl cellulose.

9. The method of claim 8 wherein from 5 to 100% of the surface of the silica is metal-modified.

10. The method of claim 8, wherein the weight ratio of silica to poly(vinyl alcohol) or methyl cellulose is greater than 1:1.

11. The method of claim 8, wherein the silica aquasol includes 5 to 40 percent silica.

12. The method of claim 10, wherein the poly(vinyl alcohol) has a molecular weight of 20,000 to 300,000 and contains at least 85 weight percent alcohol groups, calculated as vinyl alcohol.

13. The method of claim 10 wherein the average particle size of the silica in the aquasol is from 3 to 150 nm.

14. The method of claim 10 wherein the metal is aluminum, tin, zinc or lead.

15. A slurry composition for use in the manufacture of investment casting molds comprising
a silica aquasol,
poly (vinyl alcohol) or methyl cellulose, and
a refractory material,
the surface of the silica being modified to include a metal, and
the silica aquasol being deionized to a pH of 2.5 to 7 by removing all but trace quantities of alkaline ions from the silica aquasol,
wherein the binder composition is resistant to the separation of the silica aquasol and the poly(vinyl alcohol) or methyl cellulose.

16. The slurry of claim 15 wherein the refractory powder is silica or zircon.

17. The slurry of claim 15 wherein the refractory powder has a particle size of 100 to 325 mesh.

18. The slurry of claim 15, wherein from 5 to 100% of the surface of the silica is metal modified.

19. The slurry of claim 15, wherein the weight ratio of silica to poly(vinyl alcohol) or methyl cellulose is greater than 1:1.

20. The slurry of claim 15, wherein the silica aquasol includes 5 to 40 percent silica.

21. The slurry of claim 19, wherein the poly(vinyl alcohol) has a molecular weight of 20,000 to 300,000 and contains at least 85 weight percent alcohol groups, calculated as vinyl alcohol.

22. The slurry of claim 15, wherein the average particle size of the silica in the aquasol is from 3 to 150 nm.

23. The slurry of claim 15 wherein the metal is aluminum, tin, zinc or lead.

24. A method of making shell for use in an investment casting process comprising the steps of
(a) providing a binder composition comprising a silica aquasol, and poly(vinyl alcohol) or methyl cellulose, the surface of the silica being modified to include a metal, and the silica aquasol being deionized to a pH of 2.5 tio 7 by removing all but trace quantities of alkaline ions from the silica aquasol, the binder composition being resistant to the separation of the silica aquasol and the poly(vinyl alcohol) or methyl cellulose,
(b) adding a refractory material to the binder composition to form a slurry,
(c) dipping a pattern having a shape of a desired part into the slurry,
(d) raising the pattern out of the slurry to allow excess slurry to drip off the pattern,
(e) stuccoing the wet pattern with a refractory material,
(f) drying the coated pattern,
(g) repeating steps (c) through (f) to build a shell of a desired thickness around the pattern,
(h) removing the pattern from the shell, and
(i) firing the shell to burn out any polymer or pattern residue from the shell.

25. An adhesive composition comprising
a silica aquasol,
poly(vinyl alcohol) or methyl cellulose, and
clay,
the surface of the silica being modified to include a metal, and
the silica aquasol being deionized to a pH of 2.5 to 7 by removing all but trace quantities of alkaline ions from the silica aquasol,
wherein the adhesive composition is resistant to the separation of the silica aquasol and the poly(vinyl alcohol) or methyl cellulose.

* * * * *

UNITED STATES PATENT AND TRADEMARK OFFICE
CERTIFICATE OF CORRECTION

PATENT NO. : 5,118,727
DATED : June 2, 1992
INVENTOR(S) : William O. Roberts and Elizabeth R. Griffin It is certified that error appears in the above-identified patent and that said Letters Patent is hereby corrected as shown below:

Column 13, lines 41, 45 and 48, "Claim 10" should read "Claim 8".

Column 14, line 15, "Claim 19" should read "Claim 15".

Signed and Sealed this

Thirty-first Day of August, 1993

Attest:

BRUCE LEHMAN

Attesting Officer     Commissioner of Patents and Trademarks